US012711721B2

(12) United States Patent
Schnabel et al.

(10) Patent No.: US 12,711,721 B2
(45) Date of Patent: Aug. 18, 2026

(54) INTRAORAL IMAGING BEFORE AND AFTER TREATMENT

(71) Applicant: DENTSPLY SIRONA Inc., York, PA (US)

(72) Inventors: Ruwen Schnabel, Darmstadt (DE); Ole Jakubik, Hockenheim (DE); Anders Adamson, Darmstadt (DE)

(73) Assignee: Dentsply Sirona Inc., York, PA (US)

( * ) Notice: Subject to any disclaimer, the term of this patent is extended or adjusted under 35 U.S.C. 154(b) by 170 days.

(21) Appl. No.: 18/434,997

(22) Filed: Feb. 7, 2024

(65) Prior Publication Data

US 2025/0252693 A1 Aug. 7, 2025

(51) Int. Cl.

| | |
|---|---|
| ***G06T 19/00*** | (2011.01) |
| ***A61C 9/00*** | (2006.01) |
| ***G06T 7/30*** | (2017.01) |
| ***G06T 19/20*** | (2011.01) |
| ***G06V 10/25*** | (2022.01) |

(52) U.S. Cl.

CPC ............ *G06T 19/20* (2013.01); *A61C 9/0053* (2013.01); *G06T 7/30* (2017.01); *G06V 10/25* (2022.01); *G06T 2219/2004* (2013.01)

(58) Field of Classification Search

None

See application file for complete search history.

(56) References Cited

U.S. PATENT DOCUMENTS 5,969,725 A * 10/1999 Fujiki ..................... G06T 17/20 345/619
9,299,192 B2 * 3/2016 Kopelman ............ G06T 7/0012
9,451,873 B1 * 9/2016 Kopelman .............. G06T 17/00
9,510,757 B2 * 12/2016 Kopelman ............. A61B 6/469
9,775,491 B2 * 10/2017 Clausen ................. A61C 13/34
10,004,572 B2 6/2018 Kopelman
10,117,581 B2 11/2018 Kopelman
10,143,537 B2 12/2018 Kaza
10,219,875 B1 3/2019 Kopelman
10,335,252 B2 7/2019 Kaza
10,405,947 B1 9/2019 Kaza
10,470,846 B2 11/2019 Kopelman
10,603,136 B2 3/2020 Kopelman (Continued)

FOREIGN PATENT DOCUMENTS

DE 202011111080 U1 6/2019
WO 201211101 A2 1/2012
WO 2016142818 A1 9/2016

OTHER PUBLICATIONS

"European Application Serial No. 25156679.0, Extended European Search Report mailed Jul. 18, 2025", 7 pgs.

(Continued)

*Primary Examiner* — Martin Mushambo

(74) *Attorney, Agent, or Firm* — SCHWEGMAN LUNDBERG & WOESNNER, P.A.

(57) ABSTRACT

A method that includes acquiring a reference 3D model of a patient's jaw; after implementing a modification to an area of interest of the patient's jaw, acquiring an intraoral scan of the area of interest to generate an after-treatment 3D model; and unifying the reference 3D model with the after-treatment 3D model using a blending by distance operation performed on transition areas of the reference 3D model and the after-treatment 3D model.

20 Claims, 7 Drawing Sheets

(56) References Cited

U.S. PATENT DOCUMENTS

| | | | | |
|---|---|---|---|---|
| 10,610,107 | B2 | 4/2020 | Kopelman | |
| 10,702,164 | B2 | 7/2020 | Kopelman | |
| 10,993,782 | B1 * | 5/2021 | Raslambekov | G06T 19/00 |
| 11,382,720 | B2 * | 7/2022 | Kopelman | G06T 7/0012 |
| 12,229,993 | B2 * | 2/2025 | Claessen | G06T 7/75 |
| 2004/0029068 | A1 * | 2/2004 | Sachdeva | G16H 50/50 433/24 |
| 2006/0127854 | A1 * | 6/2006 | Wen | A61C 9/0053 433/213 |
| 2007/0014455 | A1 * | 1/2007 | Howerton | G16H 50/20 382/128 |
| 2007/0258638 | A1 * | 11/2007 | Howerton, Jr. | A61B 6/465 382/128 |
| 2008/0085489 | A1 * | 4/2008 | Schmitt | A61C 1/084 433/75 |
| 2010/0145898 | A1 * | 6/2010 | Malfliet | G06V 20/20 703/1 |
| 2011/0123955 | A1 * | 5/2011 | Yau | A61C 8/0077 433/201.1 |
| 2011/0212420 | A1 * | 9/2011 | Vuillemot | A61C 13/206 433/215 |
| 2012/0015316 | A1 * | 1/2012 | Sachdeva | A61B 1/24 382/128 |
| 2013/0060532 | A1 * | 3/2013 | Clausen | A61C 5/77 703/1 |
| 2013/0110469 | A1 * | 5/2013 | Kopelman | A61B 5/0062 703/1 |
| 2013/0158958 | A1 * | 6/2013 | Methot | G16H 20/40 703/1 |
| 2014/0227656 | A1 * | 8/2014 | Fudim | A61C 1/082 433/29 |
| 2015/0157416 | A1 * | 6/2015 | Andersson | A61B 34/10 606/102 |
| 2015/0265372 | A1 * | 9/2015 | Kim | A61C 13/08 433/214 |
| 2015/0302170 | A1 * | 10/2015 | Berckmans, III | A61C 8/0001 703/11 |
| 2015/0366525 | A1 * | 12/2015 | Sandholm | A61B 6/4085 378/4 |
| 2016/0095670 | A1 * | 4/2016 | Witte | A61C 7/002 433/24 |
| 2016/0171128 | A1 | 6/2016 | Kopelman | |
| 2016/0256035 | A1 * | 9/2016 | Kopelman | A61B 1/0002 |
| 2017/0319293 | A1 * | 11/2017 | Fisker | A61C 9/0053 |
| 2018/0005371 | A1 | 1/2018 | Sabina et al. | |
| 2018/0168781 | A1 * | 6/2018 | Kopelman | G06T 17/00 |
| 2019/0167113 | A1 | 6/2019 | Kopelman | |
| 2019/0231490 | A1 * | 8/2019 | Sabina | A61B 1/00194 |
| 2019/0254789 | A1 * | 8/2019 | Lancelle | A61C 9/0046 |
| 2020/0022584 | A1 | 1/2020 | Kopelman | |
| 2020/0046460 | A1 * | 2/2020 | Jang | G16H 40/67 |
| 2020/0311934 | A1 * | 10/2020 | Cherkas | G06T 19/00 |
| 2021/0082184 | A1 * | 3/2021 | Claessen | G06N 3/08 |
| 2021/0137599 | A1 * | 5/2021 | Kim | A61B 6/032 |
| 2021/0174477 | A1 * | 6/2021 | Shi | G06T 7/0002 |
| 2021/0174543 | A1 * | 6/2021 | Claessen | G06T 7/344 |
| 2021/0236241 | A1 * | 8/2021 | Jang | G16H 50/50 |
| 2021/0383548 | A1 | 12/2021 | Wilson et al. | |
| 2021/0401546 | A1 * | 12/2021 | Gardner | A61C 7/002 |
| 2022/0101618 | A1 * | 3/2022 | Reynard | G06T 7/30 |
| 2022/0139044 | A1 * | 5/2022 | Koza | G06T 7/0012 345/419 |
| 2022/0192789 | A1 * | 6/2022 | Saxler | A61C 7/36 |
| 2022/0338738 | A1 * | 10/2022 | Lee | H04N 13/218 |
| 2023/0218371 | A1 * | 7/2023 | Cunliffe | G16H 20/40 705/2 |
| 2023/0325558 | A1 * | 10/2023 | Kukk | G16H 50/50 703/11 |
| 2023/0346515 | A1 * | 11/2023 | Pokotilov | G16H 20/40 |
| 2024/0005567 | A1 * | 1/2024 | Gao | G06T 17/00 |
| 2024/0024076 | A1 * | 1/2024 | Fridman | A61C 7/002 |
| 2024/0144480 | A1 * | 5/2024 | Seeber | G06V 10/82 |
| 2024/0185518 | A1 * | 6/2024 | Kopp | G06T 7/13 |
| 2024/0221308 | A1 * | 7/2024 | Kopp | G06T 11/00 |

OTHER PUBLICATIONS

Gao, Ge, et al., "Object Recognition and Augmentation for Wearable-Assistive System Using Egocentric RGB-D Sensor", IEEE 7th Annual International Conference on Cyber Technology in Automation, Control, and Intelligent Systems (Cyber), IEEE, XP033392159, (Jul. 31, 2017), 6 pgs.

* cited by examiner

PROCESSING UNIT 206
GRAPHICS PROCESSOR 210
NB/MCH 202
MAIN MEMORY 208
AUDIO ADAPTER 216
SIO 236
BUS 228
SB/ICH 204
BUS 218
DISK 226a
CODE 226b
CD-ROM 230
LAN ADAPTER 212
USB AND OTHER PORTS 232
PCI/PCIE DEVICES 234
KEYBOARD AND MOUSE ADAPTER 220
MODEM 222
ROM 224
NETWORK 214a
REMOTE SYSTEM 214b
STORAGE 214d
CODE 214c

INTRAORAL IMAGING BEFORE AND AFTER TREATMENT

BACKGROUND

Technical Field

The present invention relates broadly to dental imaging, and more specifically to imaging a portion of a patient's teeth requiring treatment.

Description of the Related Art

In dentistry, an intraoral scanner may be used to directly create digital impression data of a patient's oral cavity. A light source from the scanner may be projected onto the scan objects, such as full dental arches, and then a 3D model processed by the scanning software will be displayed in real-time on a touch screen. Intraoral scanners produce images of teeth and the supporting structures, allowing patients to see problems with their teeth and/or gums including tarnished or corroded fillings, fractured teeth etc.

BRIEF SUMMARY

According to an embodiment of the present disclosure, a method is disclosed. The method includes visualizing intraoral images of a portion of a patient's jaw before invasive treatment steps are performed and after invasive treatment steps are performed and includes acquiring a reference 3D model of a patient's jaw; responsive to implementing a modification to an area of interest of the patient's jaw, acquiring an intraoral scan of the area of interest to generate an after treatment 3D model; and unifying the reference 3D model with the after treatment 3D model, wherein the after treatment 3D model is smaller than the reference 3D model.

In an aspect, unifying the reference image with the after treatment 3D model includes establishing a first coordinate system for the reference 3D model and a second coordinate system for the after treatment 3D model; aligning the first coordinate system with the second coordinate system to overlay the after treatment 3D model on the reference 3D model, and reconstructing an overall 3D model by replacing at least some portions of the reference 3D model corresponding to the after treatment 3D model with the after treatment 3D model.

In another aspect, reconstructing includes computing, for an implicit representation of the reference 3D model, an overlapping area of the after treatment 3D model; computing a plurality of areas inside the overlapping area for use in a blending by distance function, each area of the plurality of areas being assigned a corresponding predetermined weight; computing, for an implicit representation of the after treatment 3D model, a plurality of other areas corresponding to the plurality of areas, for use in the blending by distance function, each area of the plurality of other areas being assigned another corresponding predetermined weight that is complementary to the corresponding predetermined weight; and converting the implicit representation of the reference 3D model and the implicit representation of the after treatment 3D model into the overall 3D model using the blending by distance function. Areas of the reference 3D model and the after-treatment 3D model contribute to the overall 3D model according to the corresponding predetermined weights of the plurality of areas and the another corresponding predetermined weights of the another plurality of areas, respectively.

According to an embodiment of the present disclosure, a system comprising a processor is disclosed. The processor is adapted to acquire a reference 3D model of a patient's jaw; responsive to implementing a modification to an area of interest of the patient's jaw, acquire an intraoral scan of the area of interest to generate an after-treatment 3D model; and unify the reference 3D model with the after-treatment 3D model. The after-treatment 3D model is smaller than the reference 3D model.

According to an embodiment of the present disclosure, a non-transitory computer-readable storage medium is disclosed including instructions that when executed by a computer, cause the computer to acquire a reference 3D model of a patient's jaw; responsive to implementing a modification to an area of interest of the patient's jaw, acquire an intraoral scan of the area of interest to generate an after treatment 3D model; and unify the reference 3D model with the after treatment 3D model.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Overview

Figure 1:
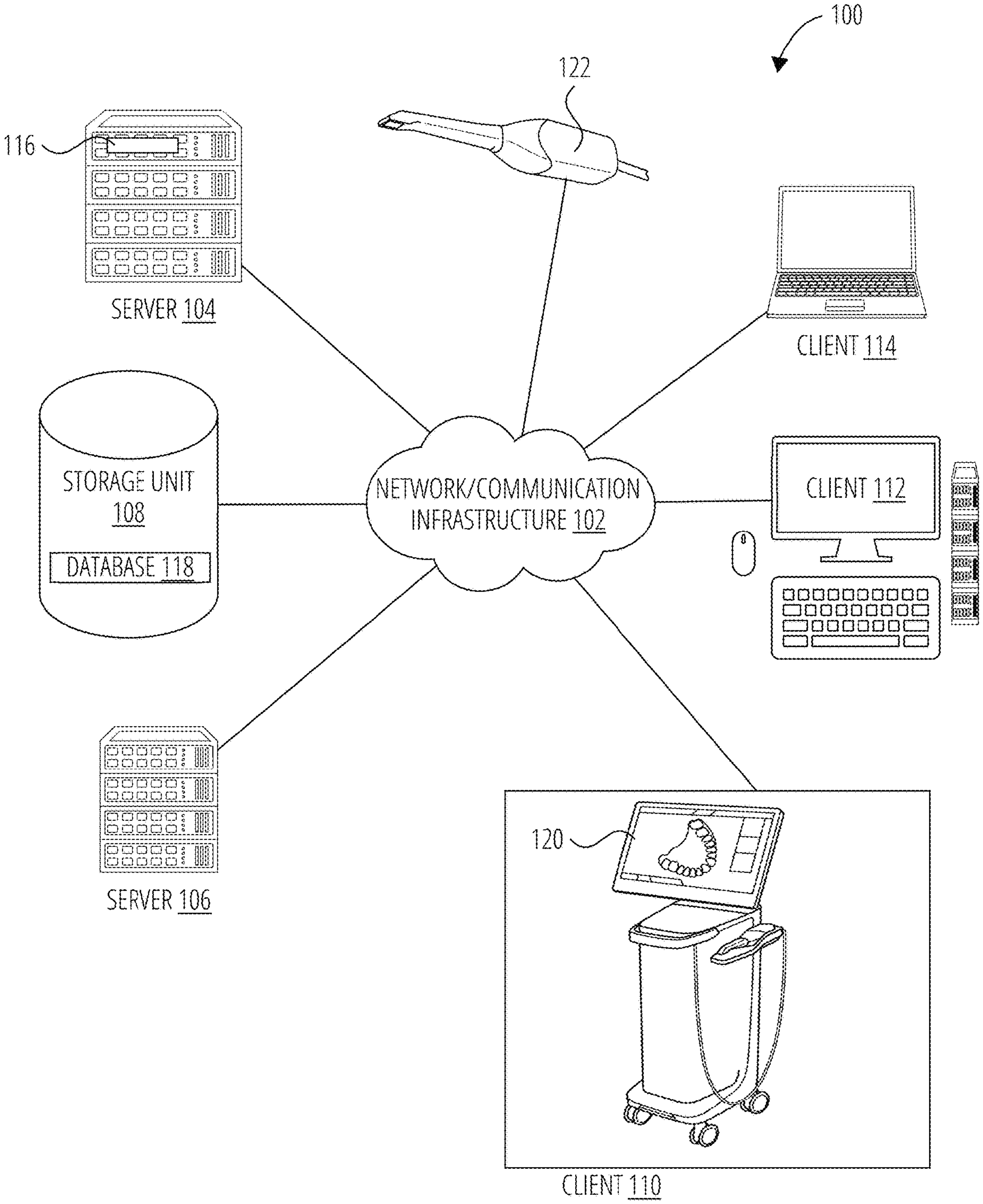
FIG. 1 depicts a block diagram of a network of data processing systems in accordance with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high level, without detail, to avoid unnecessarily obscuring aspects of the present teachings.

The illustrative embodiments recognize that in dentistry, an intraoral scanner may be used to directly create digital impression data of a patient's oral cavity. A light source from the scanner is projected onto the scan objects, such as full dental arches, and a 3D model processed by the scanning software may be displayed in real-time on a touch screen. Intraoral scanners produce images of teeth and the supporting structures, allowing patients to see problems with their teeth and/or gums including tarnished or corroded fillings, fractured teeth etc.

The illustrative embodiments further recognize that pre- and post-treatment recordings may be taken for a treatment process. However, scanning an entire jaw post-treatment may take a long time and may be uncomfortable for the patient who has just undergone the treatment.

The illustrative embodiments disclose a method of avoiding of unnecessary/time-consuming exposures and their complete model generation by accelerating the process of intraoral exposure and reconstructions for restorative treatments while obviating a need to retake a complete exposure. The illustrative embodiments disclose correction of registration errors in two 3D models of the same jaw taken in succession, taking into account any local modifications caused by treatment (e.g., preparation, scan body) in between the exposures. The correction of the error may obviate the deviations between the exposures. The illustrative embodiments further combine the exposures (before and after an invasive procedure (e.g., preparation)) with corrected registration to form two consistently reconstructed models (meshes) with differences only where modifications due to a treatment are present. In an aspect, the post-treatment exposure is representative of just an area of interest of the oral cavity where a modification was made. Therefore, the post-treatment exposure is smaller than the pre-treatment exposure (or in other words the post-treatment exposure/scan may be confined to an area of interest of the pre-treatment exposure area that was modified during treatment). To aid in unification, of the meshes/models/images, a few surrounding areas surrounding the area of interest may additional be scanned for global registration.

The illustrative embodiments are described with respect to certain types of machines. The illustrative embodiments are also described with respect to other scenes, subjects, measurements, devices, data processing systems, environments, components, and applications only as examples. Any specific manifestations of these and other similar artifacts are not intended to be limiting to the disclosure. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, hardware, algorithms, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable devices, structures, systems, applications, or architectures therefor, may be used in conjunction with such embodiment of the disclosure within the scope of the disclosure. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

FIG. 1 depicts a block diagram of an environment of data processing systems in which illustrative embodiments may be implemented. Data processing environment 100 is a network of computers in which the illustrative embodiments may be implemented. Data processing environment 100 includes network/communication infrastructure 102. Network/communication infrastructure 102 is the medium used to provide communications links between various devices, databases and computers connected together within data processing environment 100. Network/communication infrastructure 102 may include connections, such as wire, wireless communication links, or fiber optic cables.

Clients or servers are only example roles of certain data processing systems connected to network/communication infrastructure 102 and are not intended to exclude other configurations or roles for these data processing systems. Server 104 and server 106 couple to network/communication infrastructure 102 along with storage unit 108. Software applications may execute on any computer in data processing environment 100. Client 110, client 112, client 114 are also coupled to network/communication infrastructure 102. Client 110 may be a dental acquisition unit with a display. A data processing system, such as server 104 or server 106, or clients (client 110, client 112, client 114) may include data and may have software applications or software tools executing thereon.

Only as an example, and without implying any limitation to such architecture, FIG. 1 depicts certain components that are usable in an example implementation of an embodiment. For example, servers and clients are only examples and do not imply a limitation to a client-server architecture. As another example, an embodiment can be distributed across several data processing systems and a data network as shown, whereas another embodiment can be implemented on a single data processing system within the scope of the illustrative embodiments. Data processing systems (server 104, server 106, client 110, client 112, client 114) also represent example nodes in a cluster, partitions, and other configurations suitable for implementing an embodiment.

Intra-oral camera 122 includes one or more sensors, such as separate sensors, which capture surfaces of tooth and preparation areas after a treatment.

Client application 120 or server application 116 implement an embodiment described herein. Client application 120 and/or server application 116 can use data from intraoral camera 122 for visualizing intraoral images of a portion of a patient's jaw before invasive treatment steps are performed and after invasive treatment steps are performed, including acquiring a reference image of a portion of a patient's jaw, and responsive to implementing modification or treatment to the portion of the patient's jaw, acquiring an intraoral scan of the modification to the portion of the patient's jaw, and unifying the reference image with after treatment image of the portion of the patient's jaw. The images may be 3D images and are herein referred to interchangeably as 3D models.

Client application 120 can also execute in any of data processing systems (server 104 or server 106, client 110, client 112, client 114), such as client server application 116 in server 104 and need not execute in the same system as client 110.

Server 104, server 106, storage unit 108, client 110, client 112, client 114, may couple to network/communication infrastructure 102 using wired connections, wireless communication protocols, or other suitable data connectivity. Client 110, client 112 and client 114 may be, for example, personal computers or network computers.

In the depicted example, server 104 may provide data, such as boot files, operating system images, and applications to client 110, client 112, and client 114. Client 110, client 112 and client 114 may be clients to server 104 in this example. Client 110, client 112 and client 114 or some combination thereof, may include their own data, boot files, operating system images, and applications. Data processing environment 100 may include additional servers, clients, and other devices that are not shown. Server 104 includes the server application 116 that may be configured to implement one or more of the functions described herein for displaying restoration proposals in accordance with one or more embodiments.

Server 106 may include a search engine configured to search stored files such as images of patient teeth. In the depicted example, data processing environment 100 may be the Internet. Network/communication infrastructure 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of dental practices, commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 2:
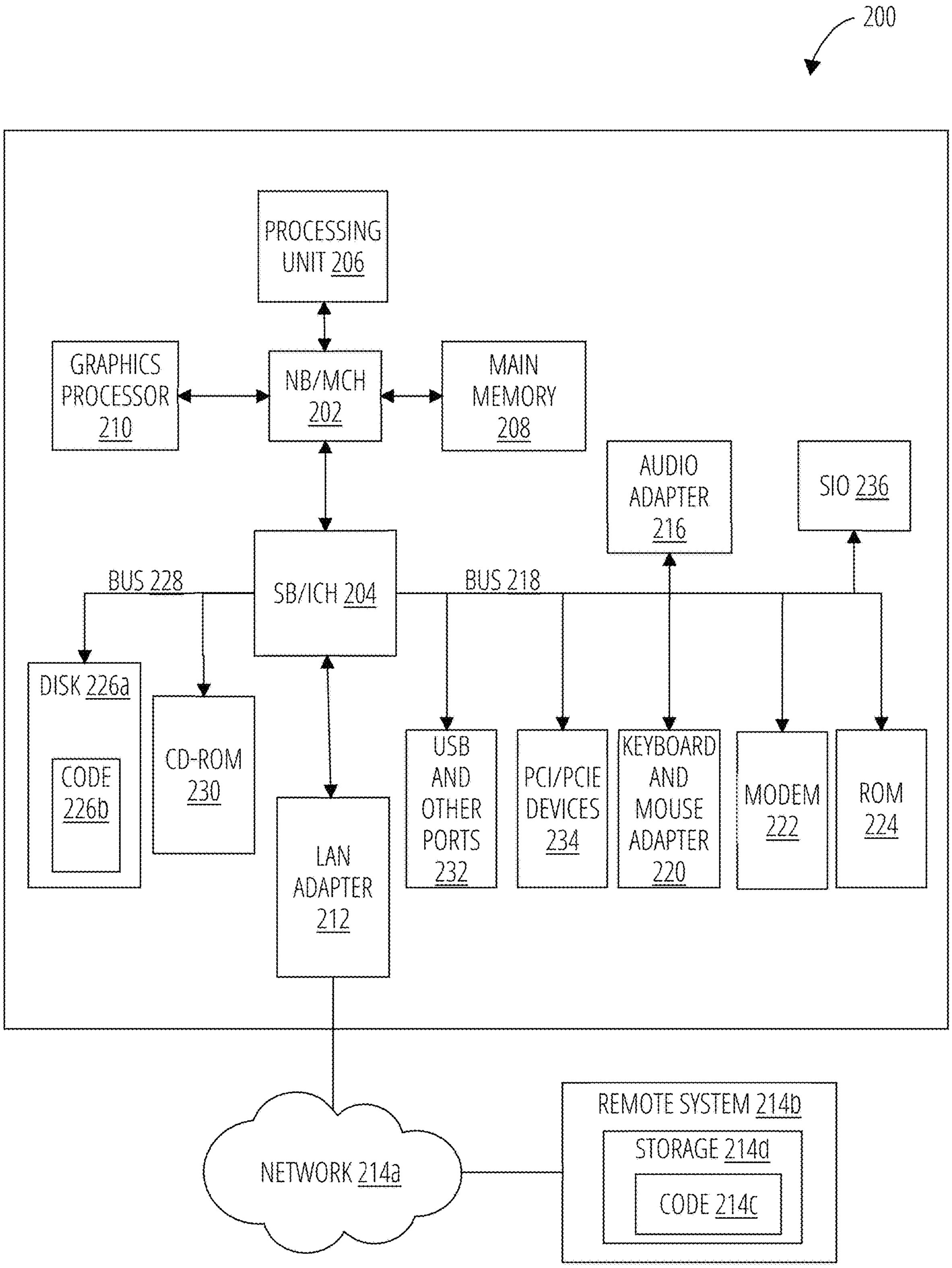
FIG. 2 depicts a block diagram of a data processing system in accordance with an illustrative embodiment.

With reference to FIG. 2, this figure depicts a block diagram of a data processing system in which illustrative embodiments may be implemented. Data processing system 200 is an example of a computer, such client 110, client 112, client 114 or server 104, server 106, in FIG. 1, or another type of device in which computer usable program code or instructions implementing the processes may be located for the illustrative embodiments.

Data processing system 200 is described as a computer only as an example, without being limited thereto. Implementations in the form of other devices, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may include one or more processors and may be implemented using one or more heterogeneous processor systems. Processing unit 206 may be a multi-core processor. Graphics processor 210 may be coupled to North Bridge and memory controller hub (NB/MCH) 202 through an accelerated graphics port (AGP) in certain implementations.

In the depicted example, local area network (LAN) adapter 212 is coupled to South Bridge and input/output (I/O) controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and input/output (I/O) controller hub (SB/ICH) 204 through bus 218. Hard disk drive (HDD) or solid-state drive (SSD) **226*a* and CD-ROM 230 are coupled to South Bridge and input/output (I/O) controller hub (SB/ICH) 204 through bus 228. PCI/PCIe devices 234 may include, for example, Ethernet adapters, add-in cards, and PC cards for notebook computers. PCI uses a card bus controller, while PCIe does not. Read only memory (ROM) 224 may be, for example, a flash binary input/output system (BIOS). Hard disk drive (HDD) or solid-state drive (SSD) 226*a* and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and input/output (I/O) controller hub (SB/ICH) 204 through bus 218**.

Memories, such as main memory 208, read only memory (ROM) 224, or flash memory (not shown), are some examples of computer usable storage devices. Hard disk drive (HDD) or solid-state drive (SSD) **226*a*, CD-ROM 230**, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as server application 116 and client application 120 in FIG. 1, are located on storage devices, such as in the form of codes 226*b* on Hard disk drive (HDD) or solid-state drive (SSD) 226*a*, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory (ROM) 224, or in one or more peripheral devices.

Furthermore, in one case, code 226*b* may be downloaded over network 214*a* (such as network/communication infrastructure 102) from remote system 214*b*, where similar code 214*c* is stored on a storage device 214*d* in another case, code 226*b* may be downloaded over network 214*a* to remote system 214*b*, where downloaded code 214*c* is stored on a storage device 214*d*.

A communications unit may include one or more devices used to transmit and receive data, such as a modem or a network adapter. A memory may be, for example, main memory 208 or a cache, such as the cache found in North Bridge and memory controller hub (NB/MCH) 202. A processing unit may include one or more processors or CPUs.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and Hard disk drive (HDD) or solid-state drive (SSD) 226*a* is manifested as a virtualized instance of all or some portion of Hard disk drive (HDD) or solid-state drive (SSD) 226*a* that may be available in the host data processing system. The host data processing system in such cases is represented by data processing system 200.

Figure 3:
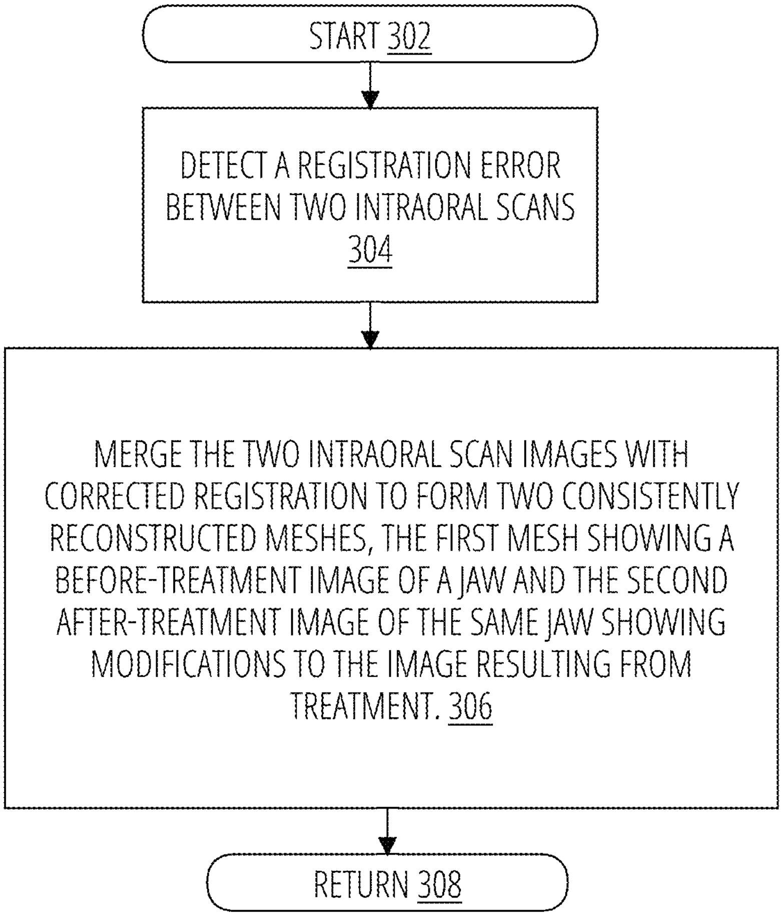
FIG. 3 depicts a routine in according with an illustrative embodiment.

Turning now to FIG. 3, a flow chart is disclosed to illustrate one or more methods herein. FIG. 3 illustrates an example method for summary. Although the example method depicts a particular sequence of operations, the sequence may be altered without departing from the scope of the present disclosure. The method may begin at block 302. According to some aspects, the method includes detecting a registration error between two intraoral scans at block 304. According to some examples, the method includes merging the two intraoral scan images with corrected registration to form a reconstructed mesh that depicts a before-treatment 3D model of a jaw and portions of the before-treatment 3D model that have been replaced with an after-treatment 3D model illustrating changed portions from the treatment at block 306. The method includes returns or ends at block 308.

Figure 4:
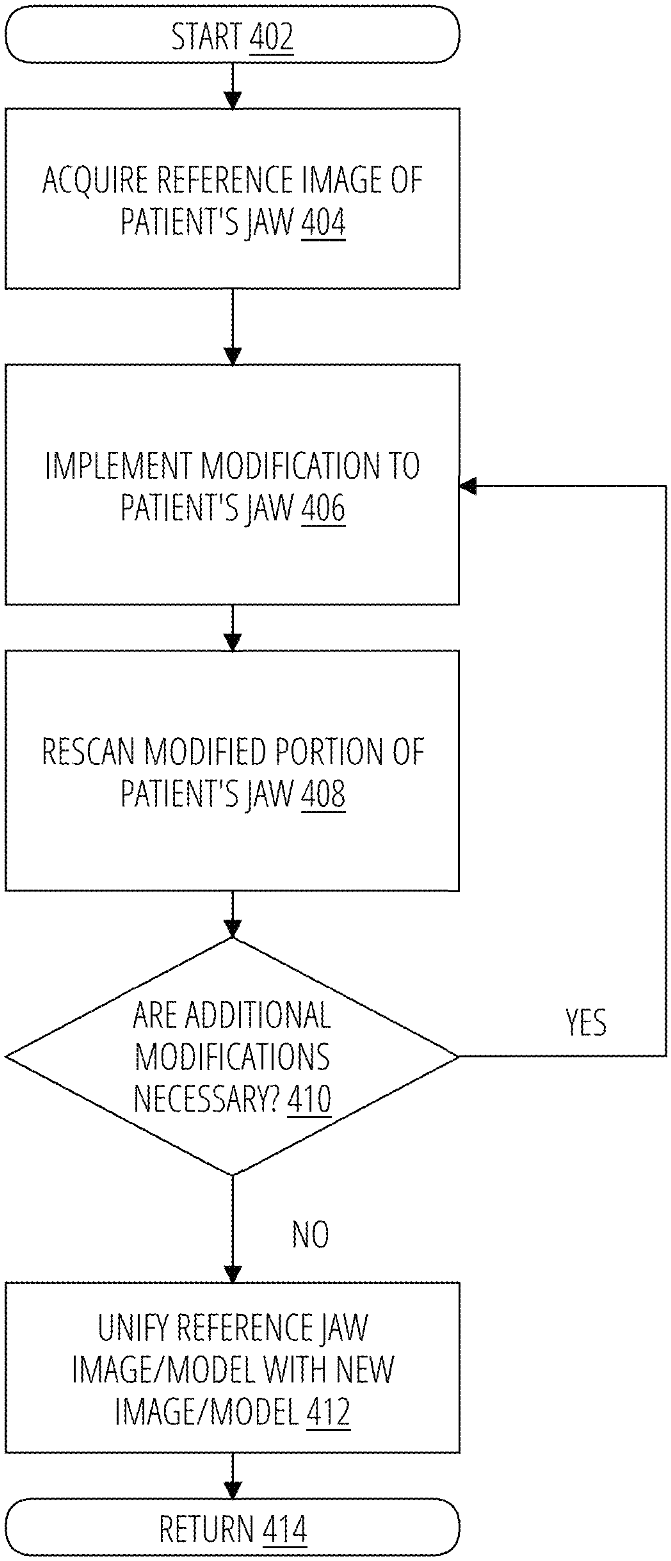
FIG. 4 depicts a routine in according with an illustrative embodiment.

FIG. 4 illustrates the method of FIG. 3 in more detail. The method starts at block 402. At block 404, a reference 3D model 500 (See FIG. 5) of patient's jaw is acquired. At block 406 a modification to patient's jaw such as the preparation of a portion of the jaw or installation of a scan body is performed responsive to which a new scan (after treatment 3D model 502) is taken of just the modified portion of the jaw. This may include unmodified surrounding areas proximal to the modified portion. Upon determining that no new scans are necessary at decision block 410, the reference 3D model and the after-treatment 3D model are unified in block 412 to form an overall 3D model 714 (see FIG. 7) according to one or more methods described herein. The method returns or ends at block 414. The unification may further comprise an alignment process wherein the reference 3D model 500 and the after treatment 3D model are brought into alignment, a global compensation process wherein an error between individual images and models are corrected, and a combination/reconstruction process wherein the aligned-globally-compensated-reference and after treatment 3D models are combined into an overall 3D model 714 representative of the patient's oral cavity situation after the treatment without having to scan all portions of the oral cavity corresponding to the reference 3D model.

Advantageously, the total time for the acquisition including construction of the overall 3D model as well as the risk of errors is significantly reduced. In some aspects, the reference 3D model is recorded before or during treatment (e.g., preparation) and therefore does not cause any addition waiting time. In some aspects, the patient's bite may be recorded before treatment. The after-treatment 3D model is recorded after treatment and thus records the changed areas of interest. This may reduce a waiting time for the patient as recording of the whole jaw is obviated.

Figure 5:
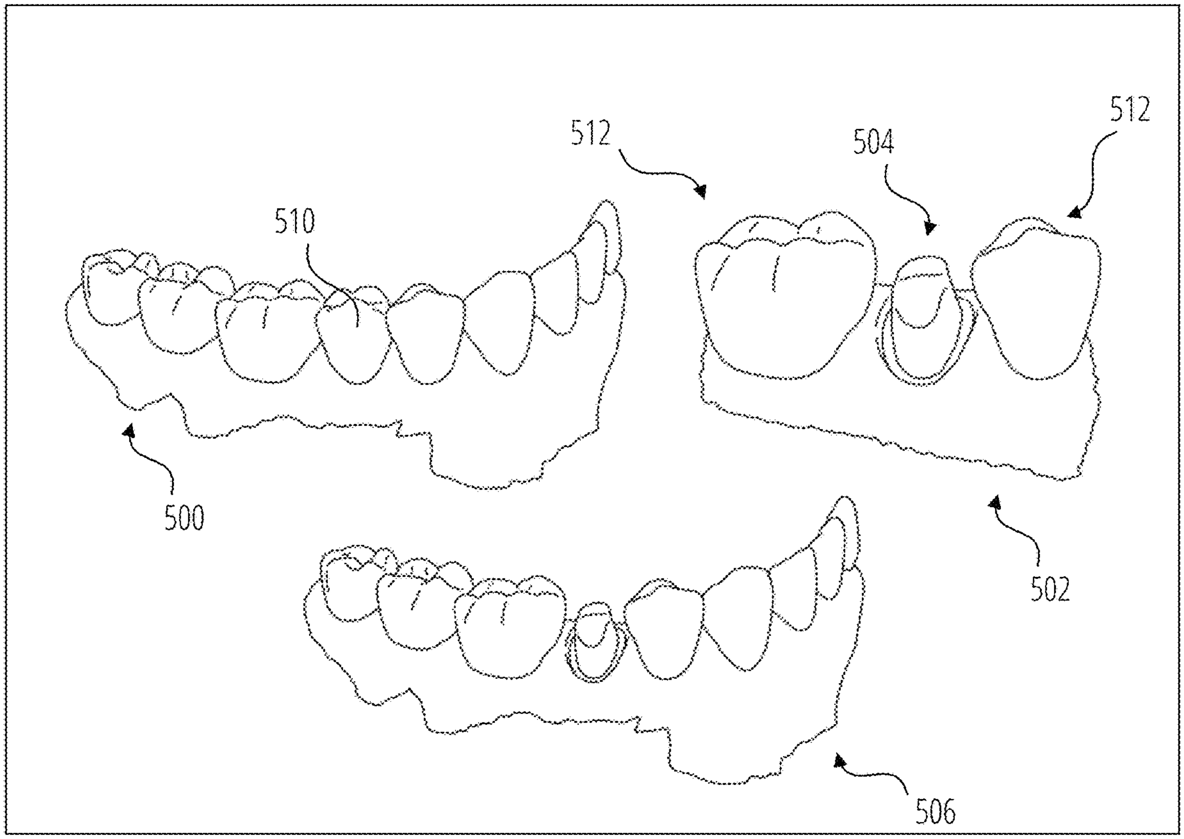
FIG. 5 depicts a plurality of meshes in accordance with an illustrative embodiment.

Turning now to FIG. 5, a sketch of a reference 3D model 500 including a tooth to be prepared 510, along with an after-treatment 3D model 502 and an aligned model 506 is shown. In the aligned model 506 of FIG. 5, the reference 3D model 500 and the after-treatment 3D model 502 are shown as being brought into alignment with the tooth to be prepared 510 being hidden. Of course, this is not meant to be limiting as other alignment techniques may be used such as making the reference 3D model 500 transparent while showing the after-treatment 3D model 502 as opaque. The after-treatment 3D model 502 further comprises a modified area of interest 504 as well as some surrounding areas 512 proximal to the modified area of interest 504. The surrounding area 512 may be unmodified.

In the alignment process, the coordinate systems of the reference 3D model 500 and the after-treatment 3D model may be brought into congruence. A feature-based method (e.g., FPFH) may be used for this purpose. If non-contiguous areas are recorded in the after-treatment 3D model, pre-registration may be performed for each non-contiguous area individually.

After the alignment, a global compensation process as discussed herein may be computed based on the reference 3D model 500. This may be performed to correct a deviation between the reference 3D model 500 and the after-treatment 3D model 502 by registering individual images of the after-treatment 3D model 502 against the reference 3D model 500 without using portions of individual images corresponding to the modification while registering. The global compensation does not only globally optimize the after-treatment individual images, but also utilizes the reference 3D model 500 (but without any "correspondences"/forces between changed areas in one model or image and corresponding unchanged areas in another model). The global compensation may also be performed for new individual images of the after-treatment 3D model 502 in real time without using portions of individual images corresponding to the modification. To determine what the individual images corresponding to the modification are, an error computation process may be performed to compute an error between the reference 3D model 500 and individual images of the after treatment 3D model 502, and responsive to computing that the error exceeds an error threshold, said individual images of the after treatment 3D model (or more specifically regions of the individual images of the after treatment model) are marked as regions corresponding to the modification and ignored in the registration. As the after treatment individual images can partly cover the modified areas regions of the individual images rather than the whole individual image may be ignored. In an aspect, regions around a changed area in an individual image of the after-treatment 3D model 502 are excluded from registration with the reference 3D model 500 but may still be used for registration with other after-treatment individual images (in a global registration of the after-treatment 3D model 502). This may alleviate or avoid any distortions of the treated (/changed) areas in the after-treatment model 502, while providing a result that is consistent with the reference 3D model 500 in the untreated (/unchanged) areas. In other words, paths (along the reference 3D model 500 and after-treatment 3D model) remain stable without introducing any drag forces from the modified areas in to the unmodified areas which would otherwise result in a distorted model.

Figure 6:
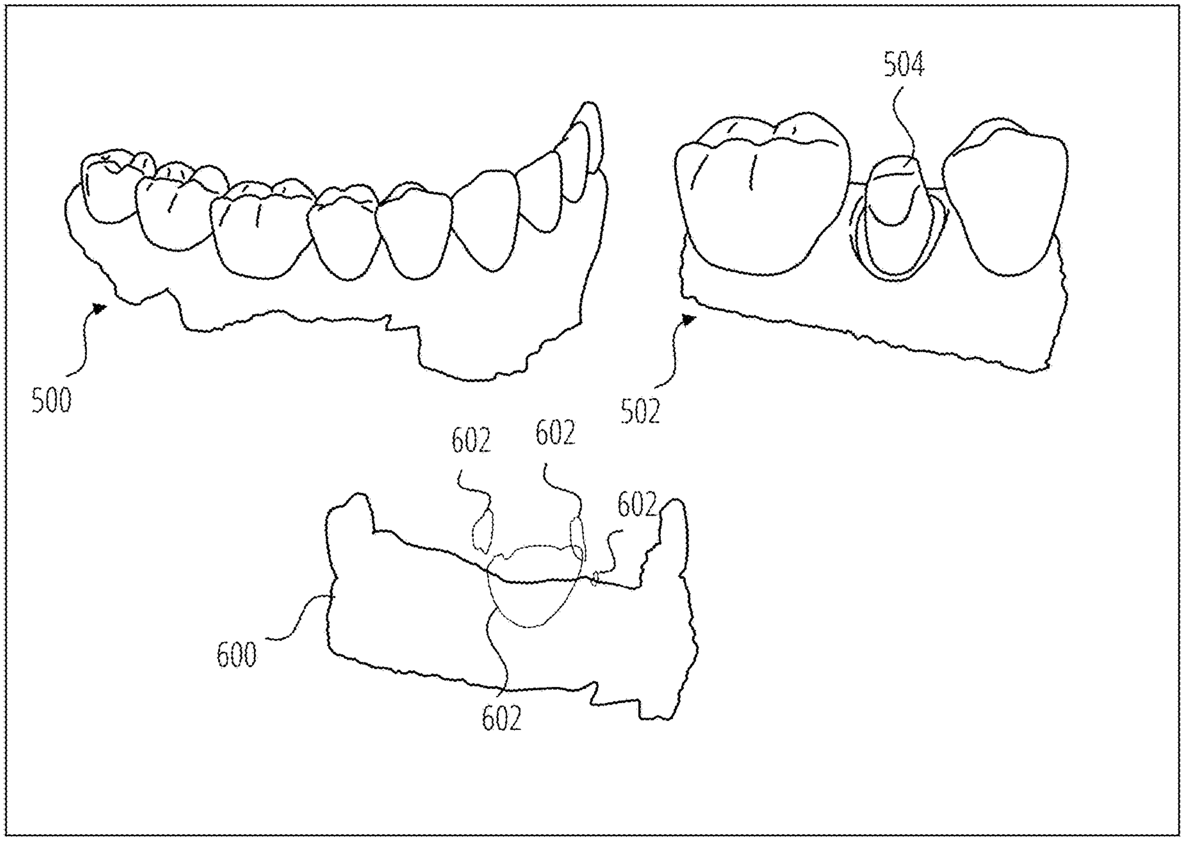
FIG. 6 depicts a plurality of meshes and overlapping in accordance with an illustrative embodiment.

As shown in FIG. 6, in the computation or formation of correspondences, it may be ideal to avoid false correspondences. Correspondences may be point to point (or point to plane) connections or positions (otherwise correspondences) between locations on different models that ideally should be at the same location after the global registration. Because of possible imprecisions, one may try to optimize the locations and orientations of each model to bring these correspondences as close as possible to reduce or equally distribute errors. False correspondence (the forces between changed areas and unchanged areas that can lead to distortions of the after-treatment mode) formation between the reference 3D model 500 and the modified areas of the after-treatment 3D model 502 may be generated by a determination of identical areas (overlap) and changed areas. FIG. 6 illustrates the overlap (outermost edge of overlapping area 600) which is shown as the outer boundaries of the overlapping areas). FIG. 6 also illustrates the changes/modified areas. The changed areas are then excluded from the correspondence formation during the global compensation. The following error analysis is used to determine the areas. An error may be a mean distance of one model to another, typically measured in a normal direction. If a closest point is searched for in unmodified regions, the distance/error is close/small. If the closest point of a location of the preparation (changed area) to a location on the reference 3D model is searched for, it will be farther away and the error large. A "typical error" would thus be in the range of noise which is rather small. The typical error between the individual images of the reference 3D model 500 and the typical error between the individual images of the after-treatment 3D model 502 is determined. Subsequently, the error between each frame of the after-treatment 3D model 502 and the reference 3D model 500 is determined. If this error is larger than the error between the respective single images of the same scan, a change is assumed and all correspondences of this single image to the reference 3D model 500 are resolved. This may be performed by finding best locations and orientations for the individual image that minimize the distances of the correspondences. For the individual image, the respective "degrees of freedom" can be used to change the position and the orientation without deforming the individual image. In addition, all correspondences on the reference 3D model 500 to other frames (correspondences can also be established starting from the reference 3D model) within a predefined spatial radius may be removed to prevent the distortion of the after treatment 3D model during the compensation.

Figure 7:
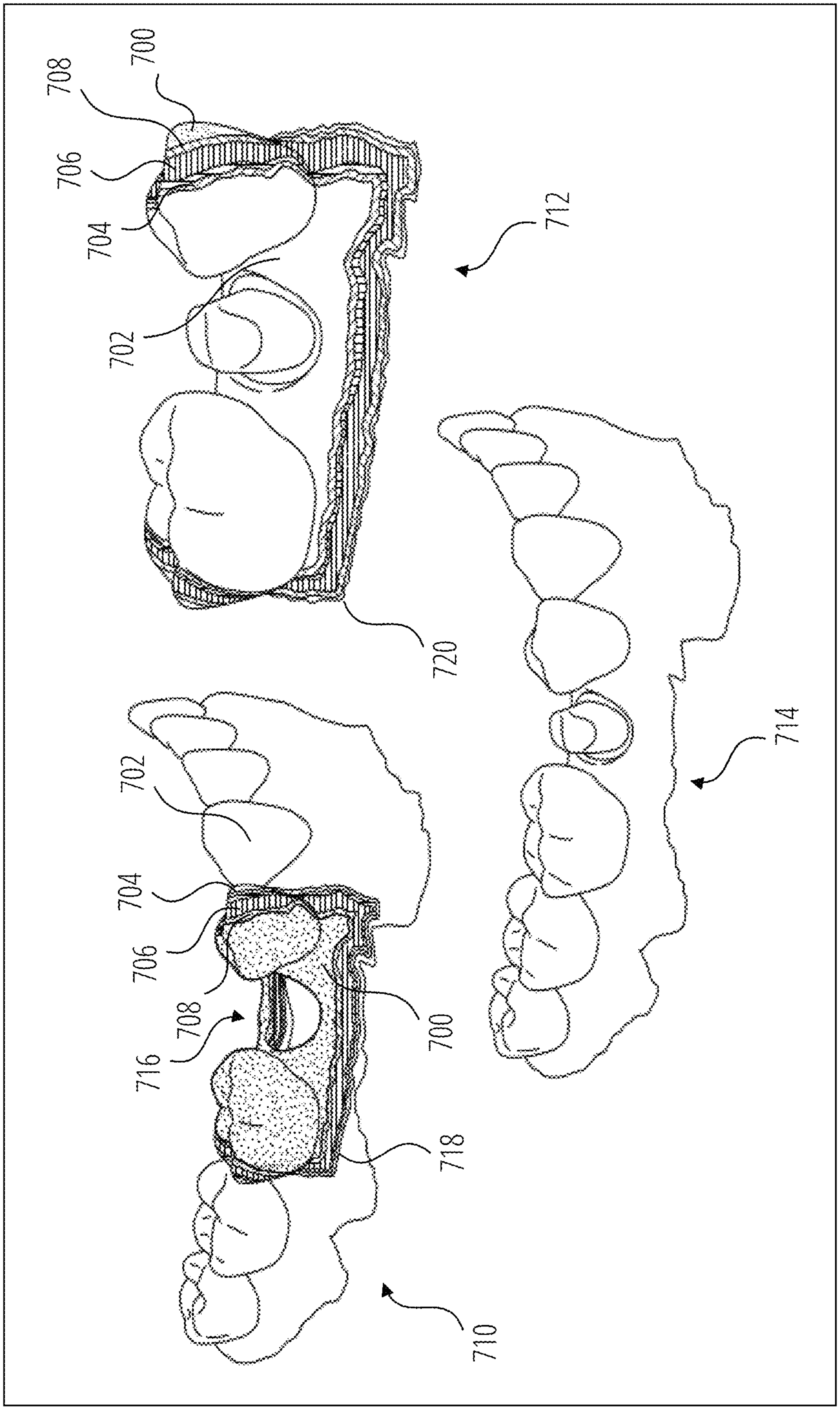
FIG. 7 depicts a plurality of meshes and a unified model in accordance with an illustrative embodiment.

Turning no to FIG. 7, a sketch is shown illustrating another reference 3D model 500 that includes a removed tooth 716, wherein the reference 3D model 500 is combined with the after-treatment 3D model 502 to form an overall 3D model 714. The combination may be a reconstruction that is performed after the aligning and global compensation.

The reconstruction may comprise providing representations (herein referred to as implicit representations, which may be a copy or other format) of the reference 3D model 500 and/or after treatment 3D model 502. For example, in an aspect, geometry can be described both explicitly (e.g. by the positions of triangle vertices) and implicitly (e.g. by distances to the surface on a regular grid). The reconstruction includes computing, for an implicit representation of the reference 3D model 710, an overlapping area 718 of the after-treatment 3D model 502. A plurality of areas (represented as original area 702, area 704, area 706, area 708, and area 700) may be computed inside the overlapping area 718 for use in a blending by distance function between outer and inner edges as discussed herein, each area of the plurality of areas being assigned a corresponding predetermined weight. A subset of the areas (e.g., area 704, area 706, area 708) may be along the periphery of the overlapping area 718. In an aspect, the areas may be visualized as different colors. For example, area 704 may be yellow, area 706 may be green, area 708 may be blue and area 700 may be violet. The remainder of the implicit representation of reference 3D model 710 may be marked as an original area 702 with a corresponding color such as pink.

Likewise, for an implicit representation of after treatment 3D model 712, a plurality of other areas (area 700, area 708, area 706, area 704, area 702) that correspond respectively to the plurality of areas of the implicit representation of reference 3D model 710 may be computed for use in the blending by distance function, each area of the plurality of other areas being assigned another corresponding predetermined weight that is complementary to the weights of the corresponding areas in the implicit representation of reference 3D model 710. For example, if a total weight is 100, and area 704 of implicit representation of after treatment 3D model 712 is assigned a value of 90, corresponding area 706 of implicit representation of reference 3D model 710 will have a value of 10 so that they add up to 100. More specifically, area 704 of the implicit representation of reference 3D model 710 may correspond to area 708 of the implicit representation of after treatment 3D model 712, area 706 of implicit representation of reference 3D model 710 may correspond to area 706 of implicit representation of after treatment 3D model 712, area 708 of implicit representation of reference 3D model 710 may correspond to area 704 of implicit representation of after treatment 3D model 712, and area 700 of implicit representation of reference 3D model 710 may correspond to original area 702 of implicit representation of after treatment 3D model 712.

In computing the overall 3D model 714, the original areas 702 of the implicit representation of reference 3D model 710 and the implicit representation of after treatment 3D model 712 may remain unchanged or have full weights (of, for example, 100) and thus will contribute fully by the blending by distance function to the overall 3D model 714 whereas the weights of the areas peripheral to the overlapping area 718 and blending border 720 are used to determine the contribution that the parts of the corresponding model at those areas make to the overall 3D model 714.

The table below illustrates an example of an increasing and decreasing order of complementary weights that may be used.

TABLE 1

| Areas vs Weights | |
|---|---|
| Area on implicit representation of reference 3D model/Weight (out of 100) | Corresponding area on implicit representation of after treatment 3D model/Weight (out of 100) |
| original area 702/100 | area 700/0 |
| area 704/75 | area 708/25 |
| area 706/50 | area 706/50 |
| area 708/25 | area 704/75 |
| area 700/0 | original area 702/100 |

Thus, the blending by distance function enables unifying the implicit representation of the reference 3D model and the implicit representation of the after-treatment 3D model into the overall 3D model 714 by using the areas of the reference 3D model and the after-treatment 3D model and their corresponding weights to contribute to the overall 3D model according to the weights. In an aspect, the weights are allotted in a decreasing order for the implicit representation of reference 3D model 710 and in an increasing order for the implicit representation of after treatment 3D model 712 so that the inner portions of the after treatment 3D model (also shown as original area 702 in the implicit representation of after treatment 3D model 712) containing the modified area of interest 504 contribute the most in the overlapping area 718 to the overall 3D model 714. Likewise, the order allows the inner portions of the reference 3D model (also shown as area 700 in the implicit representation of reference 3D model 710) containing the removed tooth 716 contribute the least in the overlapping area 718 to the overall 3D model 714. Generally, blending by distance may thus refer to generating a blending region by determining a distance along a surface from an outer boundary (starting, for example, on a side of a reference 3D model) to the (potentially multiple) inner boundaries (on, for example, a side of an after-treatment 3D model). Within that blending region, the models may be cross-fade, using weights, from the reference 3D model to the after treatment 3D model Contributions of the reference 3D model may start at full weight and blends to no weight, while contributions of the after-treatment 3D Model fades in from no weight to full weight. Of course, this is not meant to be limiting as other orders and techniques such as randomly assigned orders may be possible in light of the descriptions herein. In an aspect, the implicit representation of reference 3D model 710 and implicit representation of after treatment 3D model 712 are converted into the overall 3D model 714 using marching cubes. Marching Cubes is a computer graphics algorithm that may be used for creating a three-dimensional surface mesh from a set of three-dimensional data or scalar field data. Marching cubes may provide a way to visualize complex three-dimensional structures from volumetric data in a visually appealing and computationally efficient manner.

Thus, a computer implemented method, system or apparatus, and computer program product are provided in the illustrative embodiments for intraoral imaging before and after treatment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (Saas) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser, or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Conclusion

Although techniques using, and apparatuses including, tooth defect detection have been described in a language specific to features and/or methods, it is to be understood that the subject of the appended claims is not necessarily limited to the specific features or methods described. Rather, the specific features and methods are disclosed as example implementations of before and after treatment scanning and use:

Example 1: A method of visualizing intraoral images of a portion of a patient's jaw before invasive treatment steps are performed and after invasive treatment steps are performed, comprising: acquiring a reference 3D model of a patient's jaw; responsive to implementing a modification to an area of interest of the patient's jaw, acquiring an intraoral scan of the area of interest to generate an after treatment 3D model; and unifying the reference 3D model with the after treatment 3D model using a blending by distance operation performed on transition areas of the reference 3D model and the after-treatment 3D model. In another example, the after treatment 3D model is smaller than the reference 3D model but the reverse may also be true. In another example, the transition areas are located on edges of the reference 3D model and the after-treatment 3D model.

Example 2: The method of example 1, wherein unifying the reference image with the after treatment 3D model comprises: establishing a first coordinate system for the reference 3D model and a second coordinate system for the after treatment 3D model; aligning the first coordinate system with the second coordinate system to overlay the after treatment 3D model on the reference 3D model, and reconstructing an overall 3D model by replacing at least some portions of the reference 3D model corresponding to the after treatment 3D model with the after treatment 3D model.

Example 3: The method of example 2, wherein changed areas are identified between the first coordinate system and the second coordinate system.

Example 4. The method of examples 2 or 3, wherein aligning the first coordinate system with the second coordinate system comprises performing a fast point feature histogram (FPFH) method.

Example 5: The method of examples 1-4, wherein if non-contiguous portions of the patient's jaw are recorded in the after-treatment 3D model, pre-registration of each non-contiguous portion is performed.

Example 6: The method of examples 2-5, wherein responsive to the aligning, a global compensation is performed to correct a deviation between the reference 3D model and the after-treatment 3D model by registering individual images of the after-treatment 3D model against the reference model without using correspondences between the individual images and the reference 3D model at areas corresponding to the modification. In an aspect, the correction is based on the use of a reference model (i.e., including all individual scans) as a reference for the global compensation used to register the individual images in the after-treatment 3D model without changing the reference. In this process, the areas altered by the invasive procedure are explicitly excluded from registration against the reference.

Alternatively, the reference can also be included as variable, but this requires more computing power and increases the accuracy only insignificantly.

Example 7: The method of example 1-6, wherein the global compensation is performed for new individual images of the after-treatment 3D model in real time without using correspondences related to portions of individual images corresponding to the modification.

Example 8: The method of any preceding examples, wherein: individual images corresponding to the modification are determined by computing an error between the reference 3D model and individual images of the after treatment 3D model, and responsive to computing that the error exceeds a predetermined threshold, said individual images of the after treatment 3D model are marked as individual images corresponding to the modification and ignored.

Example 9: The method of examples 2-8, wherein the reconstructing further comprises: computing, for an implicit representation of the reference 3D model, an overlapping area of the after treatment 3D model; computing a plurality of areas inside the overlapping area for use in a blending by distance function, each area of the plurality of areas being assigned a corresponding predetermined weight; computing, for an implicit representation of the after treatment 3D model, a plurality of other areas corresponding to the plurality of areas, for use in the blending by distance function, each area of the plurality of other areas being assigned another corresponding predetermined weight that is complementary to the corresponding predetermined weight; and converting the implicit representation of the reference 3D model and the implicit representation of the after treatment 3D model into the overall 3D model using the blending by distance function wherein areas of the reference 3D model and the after treatment 3D model contribute to the overall 3D model according to the corresponding predetermined weights of the plurality of areas and the another corresponding predetermined weights of the another plurality of areas, respectively.

Example 10: The method of example 9, further comprising: converting the implicit representation of the reference 3D model and the implicit representation of the after-treatment 3D model into the overall 3D model using marching cubes.

Example 11: The method of any of the preceding examples, wherein the modification is a scan body, or a preparation of a removed gingival holder.

Example 12: A system comprising: a processor configured to perform any of the examples 1-11.

Example 13. A non-transitory computer readable storage medium storing one or more programs that when executed by a processor cause the intra-oral camera system to perform any of examples 1-11.

What is claimed is:

1. A method comprising:

acquiring a reference 3D model of a patient's jaw before a procedure commences;

after the procedure is completed and responsive to implementing a modification to an area of interest of the patient's jaw, acquiring an intraoral scan of the area of interest to generate an after-treatment 3D model; and unifying the reference 3D model with the after-treatment 3D model using a blending by distance operation performed on transition areas of the reference 3D model and the after-treatment 3D model, wherein the after-treatment 3D model is representative of only a portion of the reference 3D model.

2. The method of claim 1, wherein unifying the reference 3D model with the after-treatment 3D model comprises:

establishing a first coordinate system for the reference 3D model and a second coordinate system for the after-treatment 3D model;

aligning the first coordinate system with the second coordinate system to overlay the after-treatment 3D model on the reference 3D model, and reconstructing an overall 3D model by replacing at least some portions of the reference 3D model corresponding to the after-treatment 3D model with the after-treatment 3D model.

3. The method of claim 2, wherein changed areas corresponding to the modification are identified between the first coordinate system and the second coordinate system.

4. The method of claim 2, wherein aligning the first coordinate system with the second coordinate system comprises performing a fast point feature histogram (FPFH) method.

5. The method of claim 4, wherein if non-contiguous portions of the patient's jaw are recorded in the after-treatment 3D model, pre-registration of each non-contiguous portion is performed.

6. The method of claim 2, wherein responsive to the aligning, a global compensation is performed to correct a deviation between the reference 3D model and the after-treatment 3D model by registering individual images of the after-treatment 3D model against the reference 3D model without using correspondences between the individual images and the reference 3D model at areas corresponding to the modification.

7. The method of claim 6, wherein the global compensation is performed for new individual images of the after-treatment 3D model in real time without using said correspondences that are based on the new individual images.

8. The method of claim 6, wherein:

individual images corresponding to the modification are determined by computing an error between the reference 3D model and individual images of the after-treatment 3D model, and responsive to computing that the error exceeds an error threshold, said individual images of the after-treatment 3D model are marked as individual images corresponding to the modification and ignored.

9. The method of claim 2, wherein the reconstructing further comprises:

computing, for an implicit representation of the reference 3D model, an overlapping area of the after-treatment 3D model;

computing a plurality of areas inside the overlapping area for use in the blending by distance operation, each area of the plurality of areas being assigned a corresponding predetermined weight;

computing, for an implicit representation of the after-treatment 3D model, a plurality of other areas corresponding to the plurality of areas, for use in the blending by distance operation, each area of the plurality of other areas being assigned another corresponding predetermined weight that is complementary to the corresponding predetermined weight; and converting the implicit representation of the reference 3D model and the implicit representation of the after-treatment 3D model into the overall 3D model using the blending by distance operation wherein areas of the reference 3D model and the after-treatment 3D model contribute to the overall 3D model according to the corresponding predetermined weights of the plurality of areas and the another corresponding predetermined weights of the another plurality of areas, respectively.

10. The method of claim 9, further comprising:

converting the implicit representation of the reference 3D model and the implicit representation of the after-treatment 3D model into the overall 3D model using marching cubes.

11. The method of claim 1, wherein the modification is a scan body or a preparation of a removed gingival holder.

12. A system comprising:

memory to store instructions; and a processor configured by the instructions to:

acquire a reference 3D model of a patient's jaw before a procedure commences;

after the procedure is completed and responsive to implementing a modification to an area of interest of the patient's jaw, acquire an intraoral scan of the area of interest to generate an after-treatment 3D model; and unify the reference 3D model with the after-treatment 3D model using a blending by distance operation performed on transition areas of the reference 3D model and the after-treatment 3D model, wherein the after-treatment 3D model is representative of only a portion of the reference 3D model.

13. The system of claim 12, wherein to unify the reference 3D model with the after-treatment 3D model the processor is further configured to:

establish a first coordinate system for the reference 3D model and a second coordinate system for the after-treatment 3D model;

align the first coordinate system with the second coordinate system to overlay the after-treatment 3D model on the reference 3D model, and reconstruct an overall 3D model by replacing at least some portions of the reference 3D model corresponding to the after-treatment 3D model with the after-treatment 3D model.

14. The system of claim 13, wherein the processor is further configured to:

align the first coordinate system with the second coordinate system by performing a fast point feature histogram (FPFH) method.

15. The system of claim 14, wherein if non-contiguous portions of the patient's jaw are recorded in the after-treatment 3D model, pre-registration of each non-contiguous portion is performed.

16. The system of claim 13, wherein the processor is further configured to:

perform, responsive to the aligning, a global compensation to correct a deviation between the reference 3D model and the after-treatment 3D model by registering individual images of the after-treatment 3D model against the reference 3D model without using correspondences between the individual images and the reference 3D model at areas corresponding to the modification.

17. The system of claim 16, wherein the processor is further configured to perform the global compensation for new individual images of the after-treatment 3D model in real time without said correspondences that are based on the new individual images.

18. The system of claim 16, wherein the processor is further configured to:

determine individual images corresponding to the modification by computing an error between the reference 3D model and individual images of the after-treatment 3D model, and mark, responsive to computing that the error exceeds an error threshold, said individual images of the after-treatment 3D model as individual images corresponding to the modification and ignored.

19. The system of claim 13, wherein to reconstruct, the processor is further configured to:

compute, for an implicit representation of the reference 3D model, an overlapping area of the after-treatment 3D model;

compute a plurality of areas inside the overlapping area for use in the blending by distance operation, each area of the plurality of areas being assigned a corresponding predetermined weight;

compute, for an implicit representation of the after-treatment 3D model, a plurality of other areas corresponding to the plurality of areas, for use in the blending by distance operation, each area of the plurality of other areas being assigned another corresponding predetermined weight that is complementary to the corresponding predetermined weight; and convert the implicit representation of the reference 3D model and the implicit representation of the after-treatment 3D model into the overall 3D model using the blending by distance operation wherein areas of the reference 3D model and the after-treatment 3D model contribute to the overall 3D model according to the corresponding predetermined weights of the plurality of areas and the another corresponding predetermined weights of the another plurality of areas, respectively.

20. A non-transitory computer-readable storage medium including instructions that when executed by a computer, cause the computer to:

acquire a reference 3D model of a patient's jaw before a procedure commences;

after the procedure is completed and responsive to implementing a modification to an area of interest of the patient's jaw, acquire an intraoral scan of the area of interest to generate an after-treatment 3D model; and unify the reference 3D model with the after-treatment 3D model using a blending by distance operation performed on transition areas of the reference 3D model and the after-treatment 3D model, wherein the after-treatment 3D model is representative of only a portion of the reference 3D model.

* * * * *